US012474734B2

(12) United States Patent
Liu et al.

(10) Patent No.: US 12,474,734 B2
(45) Date of Patent: Nov. 18, 2025

(54) ELECTRONIC APPARATUS

(71) Applicant: LENOVO (SINGAPORE) PTE. LTD., Singapore (SG)

(72) Inventors: Yalu Liu, Yokohama (JP); Hiroaki Kinoshita, Yokohama (JP); Takayuki Morino, Yokohama (JP); Haonan Xiao, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 111 days.

(21) Appl. No.: 18/635,479

(22) Filed: Apr. 15, 2024

(65) Prior Publication Data

US 2024/0419211 A1 Dec. 19, 2024

(30) Foreign Application Priority Data

Jun. 14, 2023 (JP) ................................ 2023097968

(51) Int. Cl.
*G06F 1/16* (2006.01)

(52) U.S. Cl.
CPC .......... *G06F 1/1616* (2013.01); *G06F 1/1652* (2013.01); *G06F 1/1681* (2013.01)

(58) Field of Classification Search
CPC combination set(s) only.
See application file for complete search history.

(56) References Cited

U.S. PATENT DOCUMENTS 11,487,329 B2 * 11/2022 Tsuchihashi .......... G06F 1/1652
11,615,722 B2 * 3/2023 Morino ................. G06F 1/1616
345/173
11,723,170 B2 * 8/2023 Ohyama ............... G06F 1/1681
361/679.27
11,758,672 B2 * 9/2023 Morino ................. G06F 1/1681
361/807
12,136,365 B2 * 11/2024 Park ....................... H04M 1/022
12,287,679 B2 * 4/2025 Morino ................. G06F 1/1656
12,287,682 B2 * 4/2025 Miyamoto .......... H04M 1/0216
12,297,859 B2 * 5/2025 Morino ................. G06F 1/1656
12,360,573 B2 * 7/2025 Takahashi ............... G06F 1/203
12,386,396 B2 * 8/2025 Kinoshita ............. G06F 1/1656
2022/0068167 A1 * 3/2022 Park ...................... G06F 1/1616
2022/0343808 A1 * 10/2022 Morino ................. G06F 1/1616
(Continued)

FOREIGN PATENT DOCUMENTS

JP 2022166990 A 11/2022

*Primary Examiner* — Lisa Lea-Edmonds
(74) *Attorney, Agent, or Firm* — SHIMOKAJI IP

(57) ABSTRACT

An electronic apparatus includes a first chassis, a second chassis, a display having a bending region, a support component with a support surface which supports the bending region and has a step on the support surface, a first movable component, and a second movable component. A first sheet-like member that has flexibility, extends along a longitudinal direction of the support component, and one edge portion is disposed between the bending region and the support surface, and the other edge portion is fixed to the first surface; and a second sheet-like member that has flexibility, extends along the longitudinal direction of the support component, and one edge portion is disposed between the bending region and the support surface to face the one edge portion of the first sheet-like member, and the other edge portion is fixed to the second surface.

7 Claims, 7 Drawing Sheets

(56) References Cited

U.S. PATENT DOCUMENTS

| | | | | |
|---|---|---|---|---|
| 2023/0266803 | A1* | 8/2023 | Takahashi | G06F 1/1652<br>361/679.27 |
| 2023/0287929 | A1* | 9/2023 | Morino | G06F 1/1641 |
| 2023/0288960 | A1* | 9/2023 | Morino | G06F 1/1652 |
| 2023/0288964 | A1* | 9/2023 | Morino | G06F 1/1641 |
| 2023/0305602 | A1* | 9/2023 | Miyamoto | G06F 1/1616 |
| 2023/0309249 | A1* | 9/2023 | Kinoshita | G06F 1/1652 |
| 2024/0134415 | A1* | 4/2024 | Ohyama | H05K 7/20472 |
| 2024/0138116 | A1* | 4/2024 | Ohyama | G06F 1/1681 |
| 2024/0211004 | A1* | 6/2024 | Kinoshita | G06F 1/1681 |
| 2024/0419211 | A1* | 12/2024 | Liu | G06F 1/1681 |

* cited by examiner

ELECTRONIC APPARATUS

BACKGROUND OF THE INVENTION

Field of the Invention

The present invention relates to an electronic apparatus in which a plurality of chassis is connected by a hinge device.

Description of the Related Art

In recent years, electronic apparatuses such as PCs and smartphones that have a touch panel type liquid crystal display and do not have a physical keyboard are rapidly spreading. This type of display of the electronic apparatus is desired to be large when in use, but is desired to be small when not in use. Therefore, an electronic apparatus, which is configured such that not only a chassis but also a display is able to be bent by using a flexible display such as organic electro luminescence (EL), has been proposed (see, for example, Japanese Unexamined Patent Application Publication No. 2022-166990).

SUMMARY OF THE INVENTION

It is desired that the back surface of the flexible display as described above is supported by a surface having a high flatness with a small step in a state of being opened by 180 degrees. This is because, for example, in a case where a pen or a fingertip picks up a step during the touch operation, the operational feeling is deteriorated. However, for example, a mechanism component such as a component of a hinge device may be disposed on a back surface side of a bending region of the display, and it is difficult to completely eliminate the step from such a component. In addition, even in a case where the flexible display does not support the touch operation, the flexible display is extremely thin and weak to an impact or the like. Therefore, in a case in which there is a step directly below the back surface of the bending region, there is a possibility that a failure may occur in a case in which the display is subjected to an impact or the like.

The present invention is made in consideration of the above-described problems of the related art, and an object of the present invention is to provide an electronic apparatus capable of stably supporting a display that is bent.

The electronic apparatus according to a first aspect of the present invention includes a first chassis; a second chassis configured to be adjacent to the first chassis and connected to the first chassis to be relatively rotatable between a first posture in which the first chassis and the second chassis are stacked such that surface normal directions of the first chassis and the second chassis overlap each other, and a second posture in which the surface normal directions of the first chassis and the second chassis are disposed side by side each other on left and right sides; a display configured to be provided over between the first chassis and the second chassis, and have a bending region which is bent according to relative rotations of the first chassis and the second chassis; a support component configured to extend along adjacent end portions of the first chassis and the second chassis to straddle the adjacent end portions, be provided with a support surface which supports a back surface of the bending region during the second posture, and have a step on the support surface; a first movable component configured to be disposed in the support component on a first chassis side, relatively move with respect to the support component as the first chassis and the second chassis rotate, and have a first surface aligned in the support surface on the first chassis side during the second posture; a second movable component configured to be disposed in the support component on a second chassis side, relatively move with respect to the support component as the first chassis and the second chassis rotate, and have a second surface aligned in the support surface on the second chassis side during the second posture; a first sheet-like member configured to have flexibility, and extend along a longitudinal direction of the support component, and of which one edge portion in a width direction orthogonal to the longitudinal direction is disposed between the bending region and the support surface, and the other edge portion is fixed to the first surface; and a second sheet-like member configured to have flexibility, and extend along the longitudinal direction of the support component, and of which one edge portion in a width direction orthogonal to the longitudinal direction is disposed between the bending region and the support surface to face the one edge portion of the first sheet-like member, and the other edge portion is fixed to the second surface.

The above-described aspect of the present invention can stably support the display that is bent.

DETAILED DESCRIPTION OF THE INVENTION

An electronic apparatus according to the present invention will be described in detail below with preferred embodiments with reference to the accompanying drawings.

Figure 1:
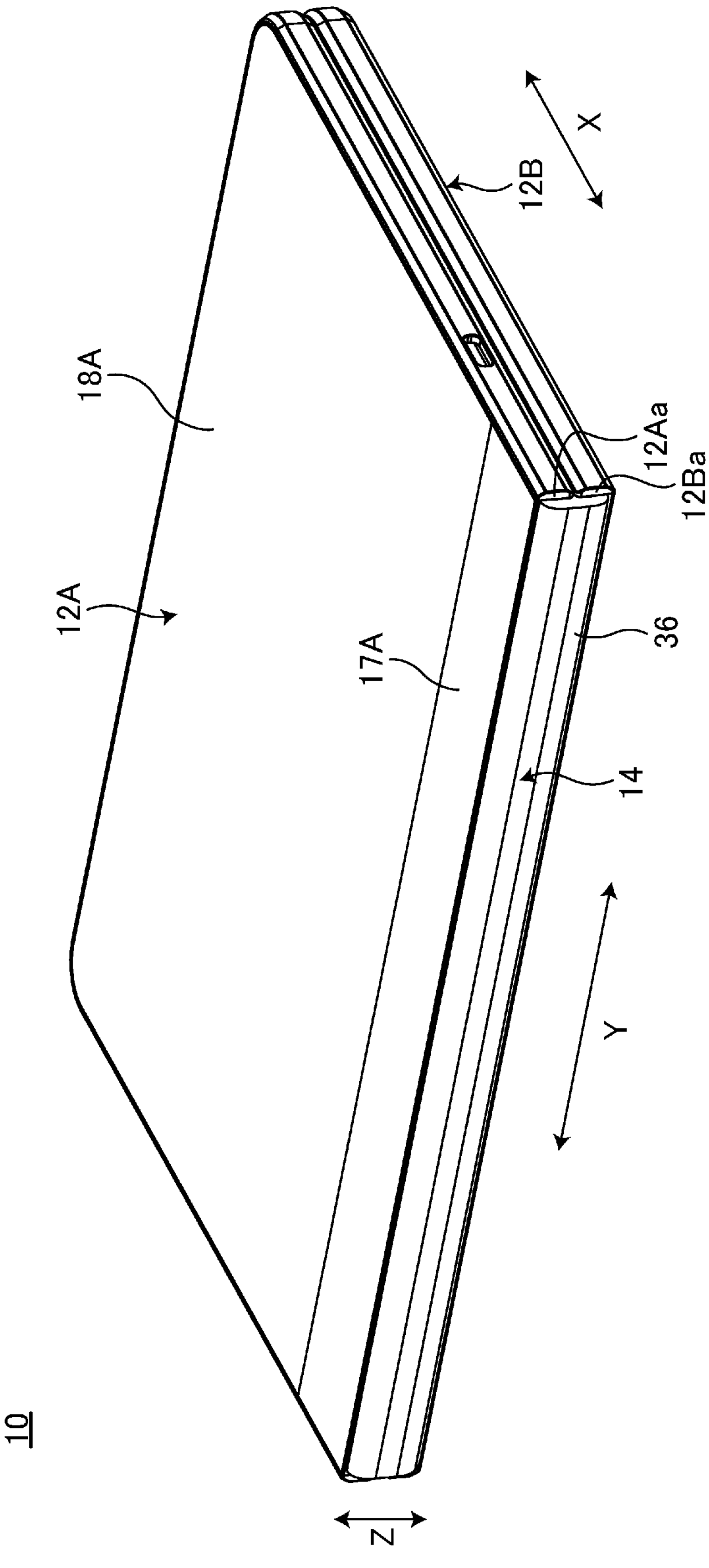
FIG. 1 is a perspective view schematically illustrating a state in which an electronic apparatus according to an embodiment is closed and in a 0-degree posture.
Figure 2:
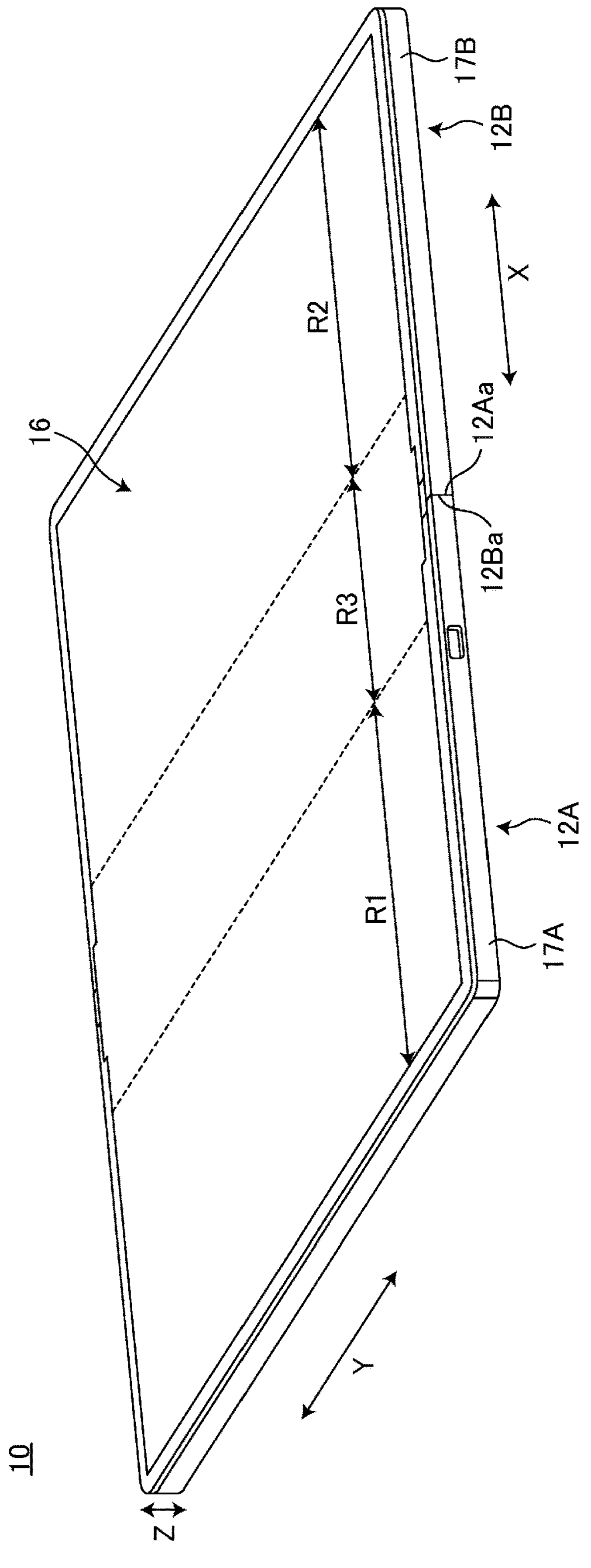
FIG. 2 is a perspective view schematically illustrating a state in which the electronic apparatus illustrated in FIG. 1 is opened and in a 180-degree posture.
Figure 3:
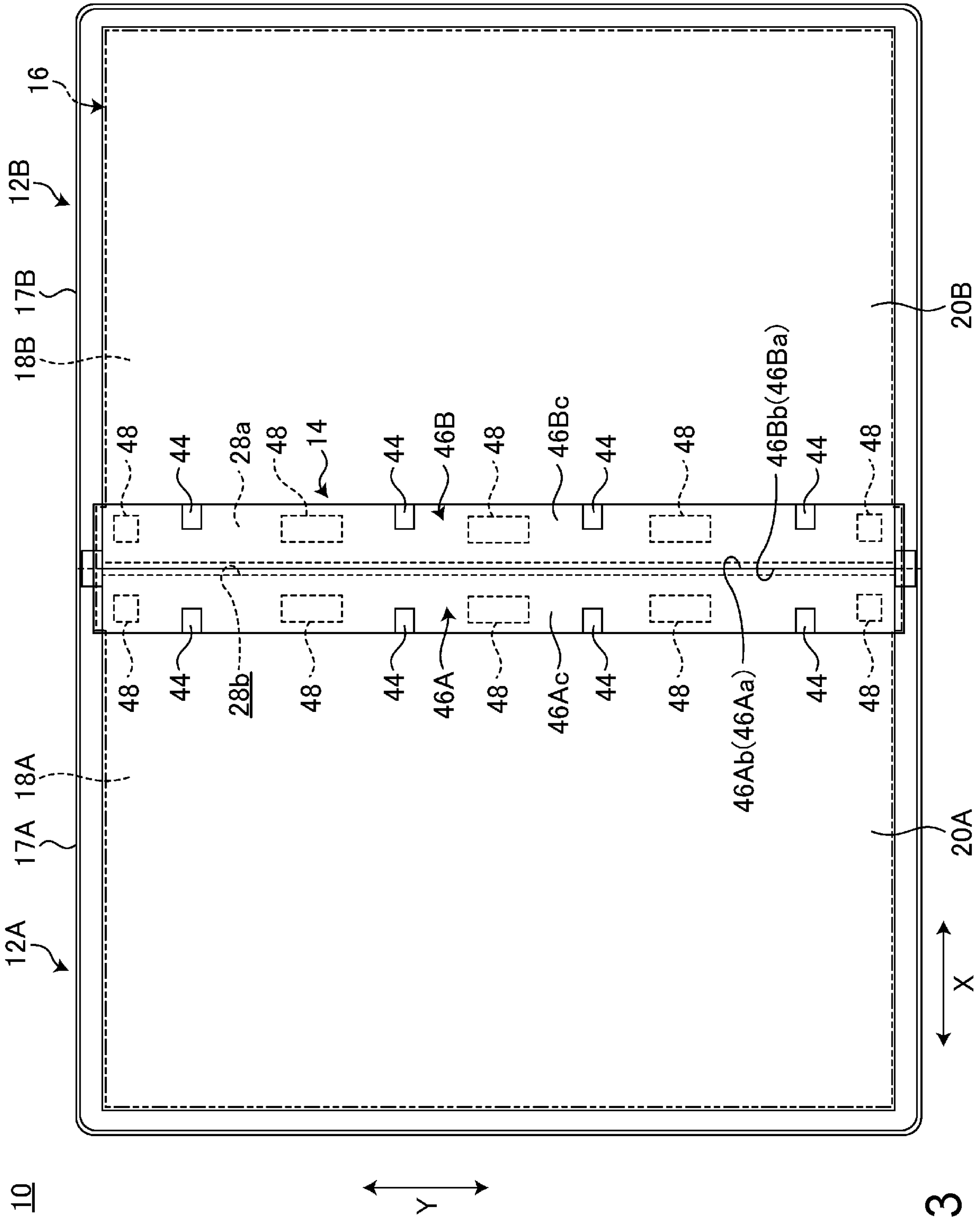
FIG. 3 is a schematic plan view of the electronic apparatus illustrated in FIG. 2.
Figure 4:
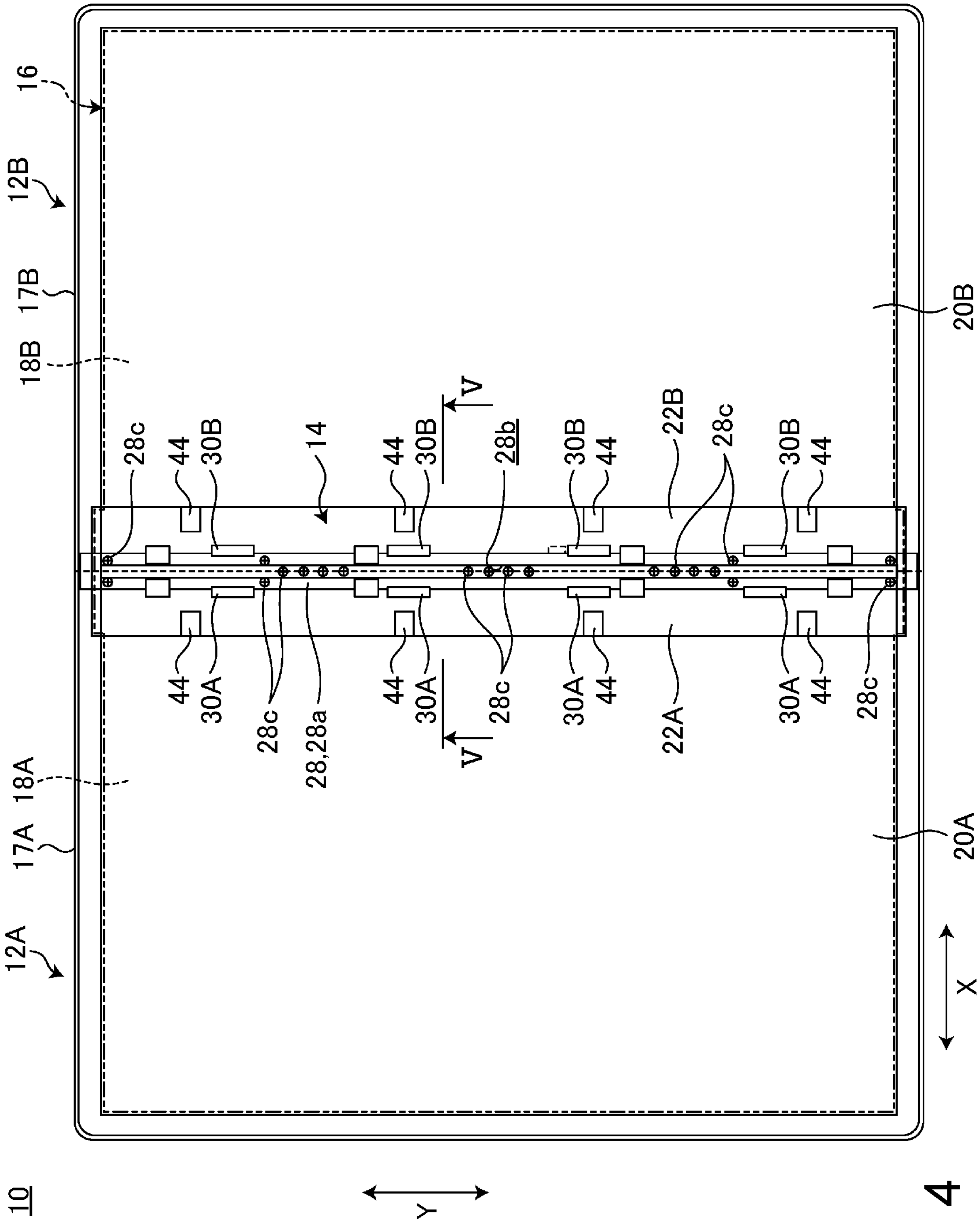
FIG. 4 is a plan view schematically illustrating an internal structure of the electronic apparatus illustrated in FIG. 2.

FIG. 1 is a perspective view schematically illustrating a state in which an electronic apparatus 10 according to an embodiment is closed and in a 0-degree posture. FIG. 2 is a perspective view schematically illustrating a state in which the electronic apparatus 10 illustrated in FIG. 1 is opened and in a 180-degree posture. FIG. 3 is a schematic plan view of the electronic apparatus 10 illustrated in FIG. 2. FIG. 4 is a plan view schematically illustrating an internal structure of the electronic apparatus 10 illustrated in FIG. 2.

As illustrated in FIGS. 1 to 4, the electronic apparatus 10 includes a first chassis 12A, a second chassis 12B, a hinge device 14, and a display 16. The electronic apparatus 10 of the present embodiment exemplifies a tablet PC or a laptop PC that is capable of being folded like a book. The electronic apparatus 10 may be a smartphone, a portable game machine, or the like.

Respective chassis 12A and 12B are disposed adjacent to each other. On each of the chassis 12A and 12B, various electronic components such as a motherboard on which a CPU is mounted, a battery device, an antenna module, and a communication module are appropriately mounted.

The first chassis 12A includes a frame member 17A and a cover member 18A. The frame member 17A is a rectangular frame-shaped member having standing walls formed on three sides other than an adjacent end portion 12Aa adjacent to the second chassis 12B. The cover member 18A is a plate-shaped member that closes a back surface opening of the frame member 17A (see also FIG. 5). Similarly, the second chassis 12B includes a frame member 17B forming standing walls on three sides other than an adjacent end portion 12Ba adjacent to the first chassis 12A, and a cover member 18B that closes a back surface opening of the frame member 17B. Surface openings of the frame members 17A and 17B are closed with the display 16.

Each of the members 17A, 17B, 18A, and 18B is made of, for example, a metal member stainless steel, magnesium, or aluminum, a fiber-reinforced resin plate containing reinforcing fibers such as carbon fiber, or the like.

The hinge device 14 connects the chassis 12A and 12B to be relatively rotatable between the 0-degree posture and the 180-degree posture. The hinge device 14 also functions as a back cover that hides a gap between the adjacent end portions 12Aa and 12Ba formed in the 0-degree posture illustrated in FIG. 1. The display 16 extends over between the chassis 12A and 12B.

Hereinafter, as for the electronic apparatus 10, description is performed while a direction in which the chassis 12A and 12B are aligned is called an X direction, a direction along the adjacent end portions 12Aa and 12Ba orthogonal thereto is called a Y direction, and a thickness direction of the chassis 12A and 12B is called a Z direction. As for the angular posture between the chassis 12A and 12B, description is performed while a state of being stacked so as to overlap each other in a surface normal direction is called the 0-degree posture (see FIG. 1), and a state of being aligned in a direction perpendicular to the surface normal direction (X direction) is called the 180-degree posture (see FIGS. 2 and 3). It is possible to call the posture between 0 and 180 degrees by appropriately carving the angle, and for example, a state in which the surface normal directions of the chassis 12A and 12B are orthogonal to each other is a 90-degree posture. These angles are for convenience of description, and an actual product may of course have angular positions slightly deviated from the exact angular positions indicated by angle numbers.

Figure 5:
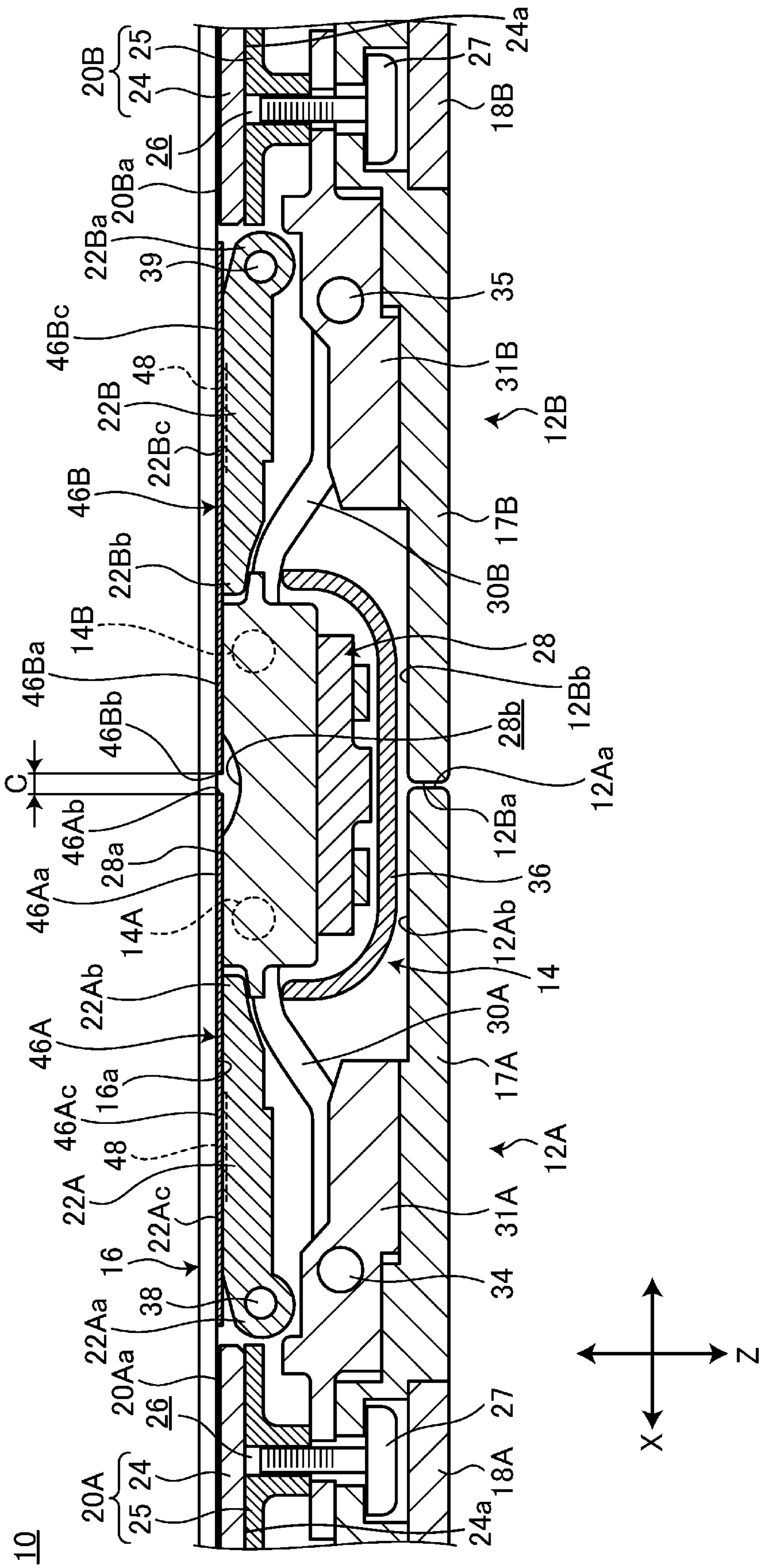
FIG. 5 is a schematic sectional view taken along line V-V in FIG. 4.
Figure 6:
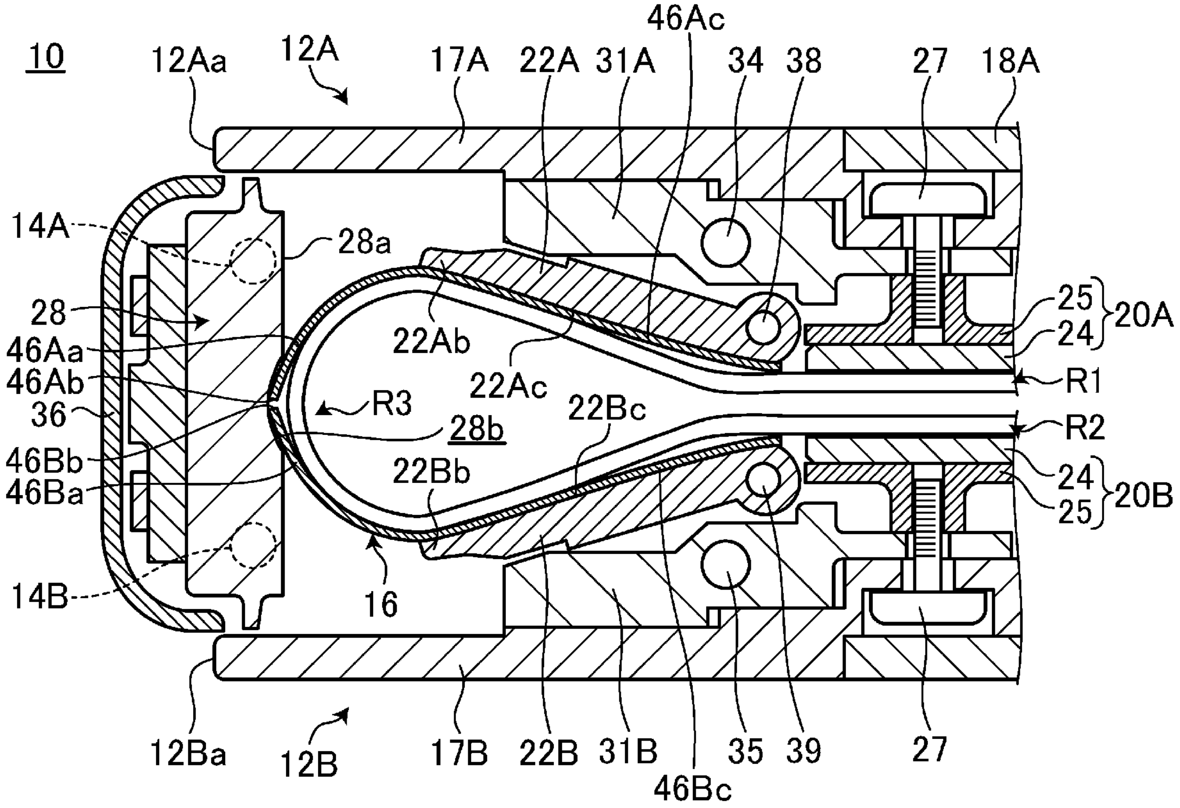
FIG. 6 is a schematic sectional view illustrating a state in which the electronic apparatus illustrated in FIG. 5 is in the 0-degree posture.

FIG. 5 is a schematic sectional view taken along line V-V in FIG. 4. FIG. 6 is a schematic sectional view illustrating a state in which the electronic apparatus 10 illustrated in FIG. 5 is in the 0-degree posture.

In the 0-degree posture illustrated in FIGS. 1 and 6, the chassis 12A and 12B are in a state of being folded in two. The display 16 is a touch-operable paper-like flexible display formed of organic EL. During the 0-degree posture, the display 16 is disposed such that a region R1 on a first chassis 12A side faces a region R2 on a second chassis 12B side illustrated in FIG. 2, and a bending region R3, which is a boundary region between the regions R1 and R2, is in a state of being bent in an arc shape. In the 180-degree posture illustrated in FIG. 2, the chassis 12A and 12B are disposed side by side each other on the left and right sides. In this case, the display 16 has the regions R1 and R2, and the bending region R3 disposed side by side on an XY plane, and forms one flat plate shape as a whole (see also FIG. 5).

In the display 16, the region R1 is relatively fixed to the first chassis 12A, and the region R2 is relatively fixed to the second chassis 12B. Specifically, a back surface 16*a* of the region R1 is fixed to the first chassis 12A via a first plate 20A, and a back surface 16*a* of the region R2 is fixed to the second chassis 12B via a second plate 20B. The first plate 20A is adjacent to a first support plate 22A, and a second plate 20B is adjacent to a second support plate 22B (see FIGS. 4 and 5).

As illustrated in FIGS. 3 to 5, the plates 20A and 20B are disposed on the left and right sides so as to sandwich the hinge device 14 therebetween, and support the back surface 16*a* of the display 16 on the surfaces 20Aa and 20Ba, respectively. The back surface 16*a* of the display 16 has the region R1 adhesively fixed to the surface 20Aa of the first plate 20A and the region R2 adhesively fixed to the surface 20Ba of the second plate 20B.

The plates 20A and 20B are configured of, for example, a base plate 24 and a metal frame 25. The base plate 24 is, for example, a carbon fiber reinforced resin plate in which carbon fibers are impregnated with a matrix resin such as epoxy resin. The metal frame 25 is formed of, for example, magnesium alloy or the like, and fixed to an outer peripheral edge portion of a back surface 24*a* of the base plate 24.

Since the plates 20A and 20B are formed of the carbon fiber reinforced resin, it is possible to ensure a high flatness and to make the device thinner and lighter. However, the carbon fiber reinforced resin has a concern that the carbon fibers may fall off from the outer peripheral end surface (edge) in powder shapes, and further, shape processing, screw processing, or the like is also difficult. Therefore, the plates 20A and 20B are provided with the metal frame 25 to surround the outer peripheral end surfaces and the outer edge portions of the back surfaces 24*a*, respectively. The plates 20A and 20B are fixed to the frame members 17A and 17B of the chassis 12A and 12B by screwing screws 27 into screw holes 26 formed in the metal frame 25. The plates 20A and 20B may be formed of a metal material or a resin material, instead of the carbon fiber reinforced resin. In this case, the metal frame 25 may be omitted.

The bending region R3 of the display 16 is relatively movable with respect to the chassis 12A and 12B. During the 180-degree posture, the back surface 16*a* of the bending region R3 is supported by a support component 28 and the support plates 22A and 22B (see FIG. 4). During the 0-degree posture, the bending region R3 is bent in an arc shape, a part of the back surface 16*a* is supported by the support plates 22A and 22B, and most portions thereof are separated from the hinge device 14 (see FIG. 6).

As illustrated in FIGS. 3 to 5, the hinge device 14 according to the present embodiment has the support component 28, a first link arm 30A and a second link arm 30B, and a first bracket 31A and a and second bracket 31B.

The support component 28 is provided at a position straddling the adjacent end portions 12Aa and 12Ba of the chassis 12A and 12B, and extends over a substantially entire length in the Y direction along the adjacent end portions 12Aa and 12Ba. The support component 28 is a block-shaped component formed of a metal material such as aluminum. Two hinge shafts 14A and 14B aligned in the X direction in the 180-degree posture are supported by the support component 28. A surface of the support component 28 is a support surface 28*a* that supports the back surface 16*a* of the bending region R3 during the 180-degree posture. A groove portion 28*b* is formed at a center of the support surface 28*a* in the width direction (X direction). The groove portion 28*b* extends over the entire length or the substantially entire length of the support component 28 in the longitudinal direction (Y direction). The groove portion 28*b* serves as an escape portion for preventing the support surface 28*a* from crushing the bending region R3 that is bent in an arc shape during the 0-degree posture.

A first end portion of the first link arm 30A is rotatably supported around an axis of first hinge shaft 14A. A first end portion of the second link arm 30B is rotatably supported around an axis of a second hinge shaft 14B. The link arms 30A and 30B have a boomerang-shaped curved shape that is gradually close to inner surfaces 12Ab and 12Bb of the chassis 12A and 12B in a direction separating from the hinge shafts 14A and 14B.

A second end portion of the first link arm 30A is connected to the first bracket 31A by using a rotation shaft 34 to be relatively rotatable. The first bracket 31A is fixed to an inner surface 12Ab of the first chassis 12A using the screws 27 or the like. A second end portion of the second link arm 30B is connected to the second bracket 31B by using a rotation shaft 35 to be relatively rotatable. The second bracket 31B is fixed to an inner surface 12Bb of the second chassis 12B using the screws 27 or the like.

The link arms 30A and 30B, and the brackets 31A and 31B are provided to be aligned in a plurality along the Y direction which is the longitudinal direction of the support component 28 (see FIG. 4). Therefore, the support component 28 connects the chassis 12A and 12B to be relatively rotatable. A gear mechanism for synchronizing the rotation operation between the chassis 12A and 12B, a torque mechanism for applying a predetermined rotational torque to the rotation operation between the chassis 12A and 12B, and the like are also provided inside the support component 28. As illustrated in FIGS. 1 and 4, a back cover component 36 serving as a decorative cover is attached to a back surface of the support component 28. A part of the link arms 30A and 30B is exposed on the support surface 28*a* of the support component 28, and head portions of a plurality of screws 28*c* and the like for fixing the gear mechanism, the torque mechanism, and the like described above are also exposed (see FIG. 4).

During the 180-degree posture illustrated in FIG. 5, the support component 28 supports the back surface 16*a* of the bending region R3 of the display 16 on the support surface 28*a*. In this case, the support component 28 is housed in the chassis 12A and 12B and is disposed to straddle the adjacent end portions 12Aa and 12Ba which are close to or in contact with each other in the X direction. During the 0-degree posture illustrated in FIG. 6, the support component 28 is disposed to close a gap between the adjacent end portions 12Aa and 12Ba largely spaced from each other, and serves as the back cover of the electronic apparatus 10 folded like a book. In this case, the back cover component 36 is exposed to the outermost surface, so that an appearance design of the folded electronic apparatus 10 is prevented from being deteriorated (see FIG. 1). In addition, the support surface 28*a* faces the bending region R3 in which the groove portion 28*b* is bent in an arc shape, and the bending region R3 is prevented from being crushed.

The support plates 22A and 22B are plates formed of a metal material such as aluminum, and have bilaterally symmetrical shapes. The support plates 22A and 22B are provided on the inner surfaces 12Ab and 12Bb sides of the chassis 12A and 12B, and extend over the substantially entire length in the Y direction along the adjacent end portions 12Aa and 12Ba.

The first support plate 22A is disposed between the first plate 20A and the support component 28. The first support plate 22A has an edge portion 22Aa on the first plate 20A side, which is connected to the first bracket 31A to be relatively rotatable via a rotation shaft 38. The first support plate 22A has an edge portion 22Ab on the support component 28 side, which is relatively movable with respect to the support component 28.

The second support plate 22B is disposed between the second plate 20B and the support component 28. The second support plate 22B has an edge portion 22Ba on the second plate 20B side, which is connected to the second bracket 31B to be relatively rotatable via a rotation shaft 39. The second support plate 22B has an edge portion 22Bb on the support component 28 side, which is relatively movable with respect to the support component 28.

The support plates 22A and 22B are movable components that swing around the rotation shafts 38 and 39 as rotation centers in accordance with the rotation operation of the chassis 12A and 12B. During the 180-degree posture, the first support plate 22A supports the back surface 16*a* of the bending region R3 of the display 16 by the first surface 22Ac which is the surface. The second support plate 22B supports the back surface 16*a* of the bending region R3 of the display 16 by the second surface 22Bc which is the surface thereof. In an angular posture other than 180 degrees, the support plates 22A and 22B come into contact with the display 16 in a state in which a gap is provided with the display 16 or with a slight force that does not deform the display 16 (see FIG. 6). The support plates 22A and 22B may be configured to support the bending region R3 of the display 16 even in an angular posture other than 180 degrees and to correct the shape thereof. As described above, during the 180-degree posture, the support plates 22A and 22B stably support the bending region R3 of the display 16 in a plane, but do not hinder a bending operation of the bending region R3.

During the 180-degree posture illustrated in FIGS. 4 and 5, the edge portions of the plates 20A and 20B on the support plates 22A and 22B sides, and the edge portions 22Aa and 22Ba of the support plates 22A and 22B form one plane without a step. Similarly, the edge portions 22Ab and 22Bb of the support plates 22A and 22B, and the support component 28 also form one plane without a step. Therefore, during the 180-degree posture, the electronic apparatus 10 has a configuration in which the back surface 16*a* of the display 16 forming one large flat screen is supported by substantially one flat plate. Therefore, a product defect such as curving, undulation, poor visibility, or display defect of the display 16 is suppressed.

Reference numeral 44 in FIG. 3 and FIG. 4 is a slope member that protrudes from the edge portions of the plates 20A and 20B on the support plates 22A and 22B sides. The slope member 44 is a member that slides on the back surface 16*a* of the display 16 during the rotation from the 180-degree posture to the 0-degree posture, and assists in correcting the bending region R3 into an appropriate shape (linear shape or curved shape) according to the rotation angle. Recessed cutout portions are formed in the edge portions 22Ab and 22Bb of the support plates 22A and 22B, respectively, to avoid interference of the slope member 44 during the 180-degree posture. The slope member 44 may be omitted.

Incidentally, the display 16 according to the present embodiment is a paper-like flexible display of a touch operation type. During the 180-degree posture, the back surface 16*a* of the bending region R3 is supported by the support surface 28*a* of the support component 28 and the surfaces 22Ac and 22Bc of the support plates 22A and 22B. However, a step due to the groove portion 28*b* is formed on the support surface 28*a*, and further, steps due to the screws 28*c* or the like are also formed at various locations. Therefore, during the touch operation on the display 16, the user may feel the step on the support surface 28*a* on the back side of the display 16 through a pen or a fingertip, and the operational feeling is deteriorated. In particular, the groove portion 28*b* extends over substantially the entire length of the support surface 28*a* in the longitudinal direction at the center of the width direction. Therefore, for example, when performing the touch operation such as tracing the bending region R3 in the X direction, there is a possibility that the user directly receives the step due to the groove portion 28*b*.

Even in a case in which the display 16 is configured to be a non-touch panel type, it is desired that the step on the support surface 28*a* does not affect the display 16 as much as possible. The display 16, which is a flexible display, is thin and weak to an impact or the like. Therefore, for example, when the bending region R3 receives a strong impact from the display surface side, the presence of the step directly below the bending region R3 increases a possibility that the display 16 may failed.

Therefore, next, a configuration for suppressing the influence of the step formed on the support surface 28*a* from being transmitted to the display 16 and more stably supporting the display 16 will be described.

As illustrated in FIGS. 3 to 6, the electronic apparatus 10 includes a first sheet-like member 46A and a second sheet-like member 46B between the display 16 and the support surface 28*a*, and the surfaces 22Ac and 22Bc. FIG. 4 is a view in which the sheet-like members 46A and 46B in FIG. 3 are not illustrated.

The sheet-like members 46A and 46B are band-shaped sheets that extend along the longitudinal direction (Y direction) of the support component 28, respectively. The first sheet-like member 46A covers substantially half of the first surface 22Ac and the support surface 28*a* on the first chassis 12A side in the X direction. The second sheet-like member 46B covers substantially half of the second surface 22Bc and the support surface 28*a* on the second chassis 12B side in the X direction. The sheet-like members 46A and 46B are interposed between the back surface 16*a* of the display 16 and the support surface 28*a*, and the surfaces 22Ac and 22Bc during the 180-degree posture. Therefore, the sheet-like members 46A and 46B suppress the step formed on the support surface 28*a* and the steps formed on the surfaces 22Ac and 22Bc from being directly transmitted to the display 16.

Since in the electronic apparatus 10, the chassis 12A and 12B rotate with respect to each other, the sheet-like members 46A and 46B have flexibility and are able to be deformed flexibly with the rotation. The sheet-like members 46A and 46B preferably have elasticity in order to prevent plastic deformation when the chassis 12A and 12B rotate with respect to each other. An example of a material of the sheet-like members 46A and 46B is able to include a resin and a metal. However, in order to effectively prevent the step of the support surface 28*a* or the like from being transmitted to the display 16, the sheet-like members 46A and 46B are preferably formed of metal sheets having hardness higher than hardness of the resin. The sheet-like members 46A and 46B according to the present embodiment are stainless sheets. The type of the stainless steel is not limited, but for example, SUS301EH or SUS301H is able to be used.

The sheet-like members 46A and 46B are interposed between the display 16 and the support surface 28*a*, and the surfaces 22Ac and 22Bc. Therefore, in order to prevent the sheet-like members 46A and 46B themselves from forming a step, it is necessary to be extremely thin. Therefore, it is preferable that the thickness of the sheet-like members 46A and 46B is, for example, 0.2 mm or less. On the other hand, since it is necessary to prevent the step of the groove portion 28*b* or the like from being transmitted to the display 16 in the sheet-like members 46A and 46B, a certain thickness is required. Therefore, in the present embodiment, the thickness of the sheet-like members 46A and 46B is 0.05 mm.

As illustrated in FIG. 5, the first sheet-like member 46A covers from substantially the center of the support surface 28*a* in the width direction (X direction) to the first surface 22Ac of the first support plate 22A. In the first sheet-like member 46A, one edge portion 46Aa in the width direction is disposed between the bending region R3 and the support surface 28*a*, and an end surface 46Ab is disposed substantially at the center of the opening of the groove portion 28*b* in the width direction. The other edge portion 46Ac of the first sheet-like member 46A is fixed to the first surface 22Ac.

The second sheet-like member 46*b* covers from substantially the center of the support surface 28*a* in the width direction to the second surface 22Bc of the second support plate 22B. In the second sheet-like member 46B, one edge portion 46Ba in the width direction is disposed between the bending region R3 and the support surface 28*a*, and an end surface 46Bb is disposed substantially at the center of the opening of the groove portion 28*b* in the width direction. The other edge portion 46Bc of the second sheet-like member 46B is fixed to the second surface 22Bc.

The sheet-like members 46A and 46B are able to be fixed to the surfaces 22Ac and 22Bc by using, for example, an adhesive 48. A coating range of the adhesive 48 is not limited, but may be a position away from the mechanism components such as the link arms 30A and 30B exposed on the surfaces 22Ac and 22Bc (see FIG. 3). The adhesive 48 may be replaced with a double-sided adhesive tape or the like.

One edge portions 46Aa and 46Ba of the sheet-like members 46A and 46B face each other. Specifically, in the 180-degree posture, the end surfaces 46Ab and 46Bb of the sheet-like members 46A and 46B face each other. In this case, it is preferable that a predetermined gap C is formed between the end surfaces 46Ab and 46Bb. The gap C is, for example, about 0.5 mm. By providing the gap C, it is possible to prevent the one edge portions 46Aa and 46Ba of the sheet-like members 46A and 46B from overlapping on each other to form a step during the 180-degree posture. Further, due to the gap C, the end surfaces 46Ab and 46Bb of the sheet-like members 46A and 46B abut against each other and bulge upward during the 180-degree posture, and thus it is possible to suppress the pressing of the back surface 16*a* of the display 16. Therefore, it is possible to suppress the formation of wrinkles or undulation on the display 16 by the sheet-like members 46A and 46B.

In the 0-degree posture, in a state in which the one edge portions 46Aa and 46Ba of the sheet-like members 46A and 46B are inserted into the groove portions 28*b*, respectively, the end surfaces 46Ab and 46Bb face each other. Therefore, the sheet-like members 46A and 46B are prevented from crushing the bending region R3 that is bent in an arc shape. In addition, since the positions of the one edge portions 46Aa and 46Ba during the 0-degree posture are determined, the one edge portions 46Aa and 46Ba smoothly return to the original positions when rotating to the 180-degree posture thereafter. It is preferable that the end surfaces 46Ab and 46Bb of the sheet-like members 46A and 46B come into contact with the bottom surface of the groove portion 28*b* during the 0-degree posture, respectively. In this case, since the positions of the end surfaces 46Ab and 46Bb of the sheet-like members 46A and 46B are restricted during the 0-degree posture, respectively, the end surfaces 46Ab and 46Bb smoothly return to the original positions subsequently when rotating to the 180-degree posture thereafter.

As described above, the electronic apparatus 10 according to the present embodiment includes the sheet-like members 46A and 46B that have flexibility, extend along the longitudinal direction of the support component 28, and of which one edge portions 46Aa and 46Ba in the width direction orthogonal thereto are disposed between the bending region R3 and the support surface 28*a*, and the other edge portions 46Ac and 46Bc are fixed to the surfaces 22Ac and 22Bc of the movable components aligned in the support component 28.

Therefore, the electronic apparatus 10 is able to prevent the step of the support surface 28*a* that supports the back surface 16*a* of the display 16 from being directly transmitted to the display 16 by the sheet-like members 46A and 46B. As a result, the display 16 that is bent is able to be stably supported. That is, in the electronic apparatus 10, the sheet-like members 46A and 46B suppress the discomfort felt by the user due to the step of the support surface 28*a* during the touch operation of the display 16, so that the touch operational feeling is improved. In addition, even when an impact is applied to the display 16 on the display surface side, the sheet-like members 46A and 46B absorb the impact between the display 16 and the step, so that a failure of the display 16 is able to also be suppressed.

In particular, the sheet-like members 46A and 46B have flexibility, and of which the other edge portions 46Ac and 46Bc are fixed to the movable components aligned on the side portion of the support component 28, that is, the support plates 22A and 22B in the above description, and the one edge portions 46Aa and 46Ba are interposed between the support surface 28*a* and the display 16. Therefore, the sheet-like members 46A and 46B are deformed flexibly in association with the rotation between the chassis 12A and 12B, and the relative movement between the support component 28 and the movable component is not hindered, so that the rotation of the chassis 12A and 12B is not hindered. Further, by also covering the surfaces 22Ac and 22Bc with the sheet-like members 46A and 46B, it is possible to cover the step due to the gap between the support plates 22A and 22B, which are the movable components, and the support component 28.

In particular, the electronic apparatus 10 has the groove portion 28*b* for escaping the bending region R3 that is bent in an arc shape during the 0-degree posture on the support surface 28*a*. Since the groove portion 28*b* extends along the longitudinal direction of the support surface 28*a*, there is a high possibility that the user feels discomfort particularly during the touch operation. Also, in this respect, the sheet-like members 46A and 46B are disposed such that the one edge portions 46Aa and 46Ba thereof cover a part of the groove portion 28*b*, and thereby the step due to the groove portion 28*b* is able to be effectively suppressed from being directly transmitted to the display 16.

In this case, as described above, it is preferable that the end surfaces 46Ab and 46Bb of the sheet-like members 46A and 46B are close to each other with a predetermined gap C during the 180-degree posture. For example, by setting the gap C to a width of about 0.5 mm, it is possible to effectively suppress the transmission of the step of the groove portion 28*b* to the user while suppressing the overlapping and the collision between the sheet-like members 46A and 46B.

Figure 7:
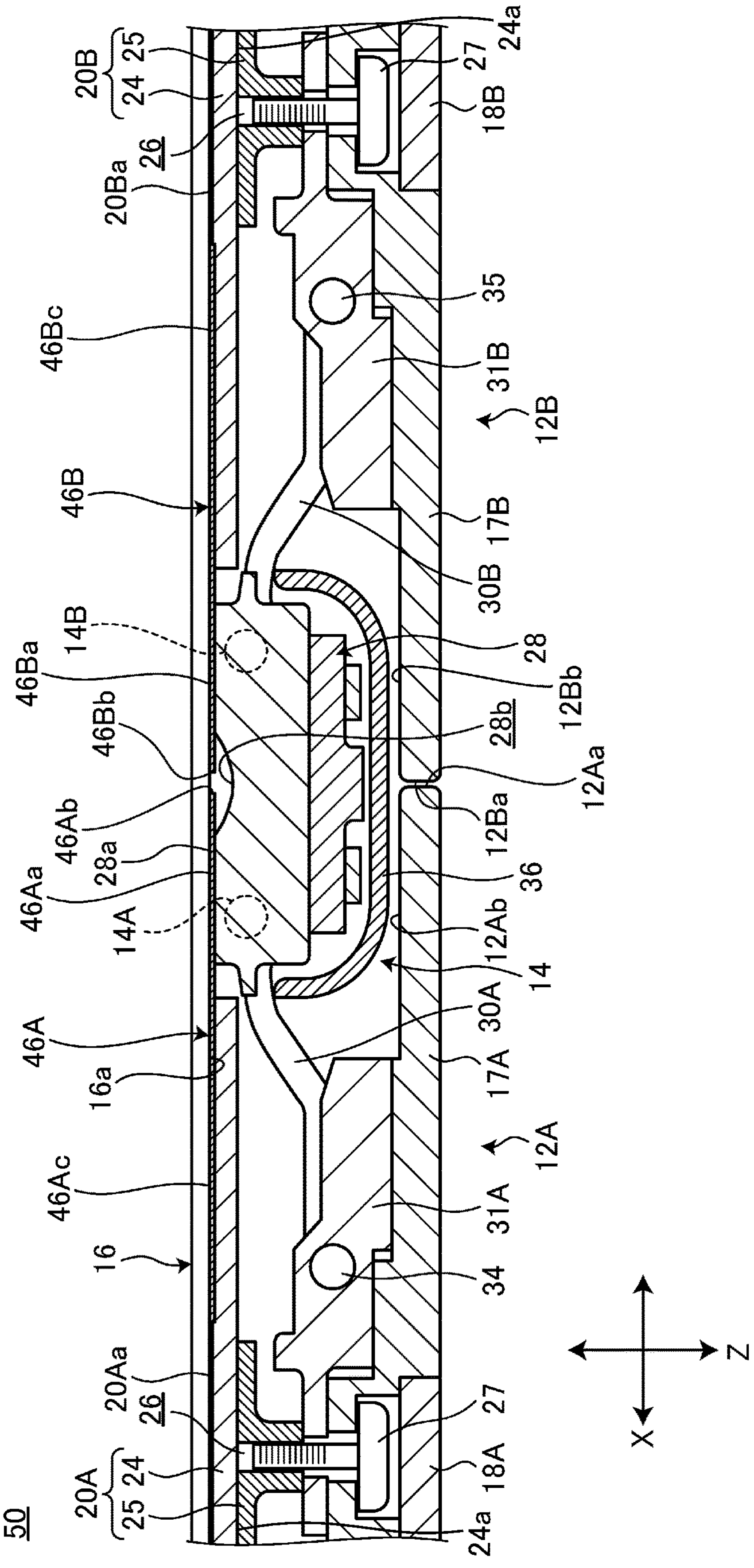
FIG. 7 is a schematic side sectional view illustrating a state in which an electronic apparatus according to a modification example is in the 180-degree posture.

FIG. 7 is a schematic side sectional view illustrating a state in which an electronic apparatus 50 according to a modification example is in the 180-degree posture. In the electronic apparatus 50 illustrated in FIG. 7, the same or similar elements having the same reference numerals as those of the electronic apparatus 10 illustrated in FIGS. 1 to 6, which exhibit the same or similar functions and effects, are provided, and detailed description thereof will be omitted.

The electronic apparatus 50 illustrated in FIG. 7 is different from the electronic apparatus 10 described above in that the support plates 22A and 22B are not provided, and the sheet-like members 46A and 46B are fixed to the plates 20A and 20B instead. That is, in the electronic apparatus 50, the plates 20A and 20B are extended to the side portion of the support component 28, and the surfaces 20Aa and 20Ba are disposed to be aligned on the side portion of the support surface 28*a*. In the electronic apparatus 50, the other edge portion 46Ac of the first sheet-like member 46A is fixed to the surface 20Aa of the first plate 20A, and the other edge portion 46Bc of the second sheet-like member 46B is fixed to the surface 20Ba of the second plate 20B. The fixing of the other edge portions 46Ac and 46Bc to the surfaces 20Aa and 20Ba may also be performed using the adhesive 48.

In this case, in the electronic apparatus 50, the plates 20A and 20B are movable components that relatively move to the support component 28. Therefore, the electronic apparatus 50 is configured to fix the sheet-like members 46A and 46B to the plates 20A and 20B and to cover the support surface 28*a* with the one edge portions 46Aa and 46Ba. Therefore, also in the electronic apparatus 50, the smooth rotation between the chassis 12A and 12B is ensured while suppressing the transmission of the influence of the step of the support surface 28*a* to the display 16.

It goes without saying that the present invention is not limited to the embodiments described above, and is able to be freely modified without departing from the gist of the present invention.

In the above description, the electronic apparatuses 10 and 50 that are able to be folded in half like a book are exemplified. It is possible to apply the present invention to, in addition to a configuration of folding the same-shaped chassis in half, for example, various configurations, such as a double-door configuration in which small chassis are foldably connected to the left and right edge portions of a large chassis, respectively, an S-shaped folding configuration in which chassis with different folding directions are connected to the left and right edge portions of one chassis, and a J-shaped folding configuration in which a small chassis is foldably connected to one of the left and right edge portions of a large chassis, and the number of chassis to be connected may be four or more.

The invention claimed is:

1. An electronic apparatus comprising:

a first chassis;

a second chassis rotatably connected to the first chassis between a first posture in which the first chassis and the second chassis are stacked such that surface normal directions of the first chassis and the second chassis overlap each other, and a second posture in which the surface normal directions of the first chassis and the second chassis are disposed side by side to each other on left and right sides;

a display over the first chassis and the second chassis, that has a bending region which is bent according to relative rotations of the first chassis and the second chassis;

a support component that extends along adjacent end portions of the first chassis and the second chassis, that straddles the adjacent end portions, that has a support surface which supports a back surface of the bending region during the second posture, and that has a step on the support surface;

a first movable component that is disposed in the support component on a first chassis side, that moves with respect to the support component as the first chassis and the second chassis rotate, and that has a first surface aligned with the support surface on the first chassis side during the second posture;

a second movable component that is disposed in the support component on a second chassis side, that moves with respect to the support component as the first chassis and the second chassis rotate, and that has a second surface aligned with the support surface on the second chassis side during the second posture;

a first sheet-like member that is flexible, that extends along a longitudinal direction of the support component, that has one edge portion in a width direction orthogonal to the longitudinal direction and between the bending region and the support surface, and that has another edge portion fixed to the first surface; and a second sheet-like member that is flexible, that extends along the longitudinal direction of the support component, and has another edge portion in a width direction orthogonal to the longitudinal direction and between the bending region and the support surface to face the one edge portion of the first sheet-like member, wherein the another edge portion is fixed to the second surface.

2. The electronic apparatus according to claim 1, wherein the step extends along a longitudinal direction of the support surface, and includes a groove portion, and in the second posture, the one edge portion of the first sheet-like member and the another edge portion of the second sheet-like member are each disposed to cover a part of the groove portion.

3. The electronic apparatus according to claim 2, wherein, in the second posture, end surfaces of the one edge portion of the first sheet-like member and the another edge portion of the second sheet-like member are adjacent to each other with a predetermined gap above the groove portion.

4. The electronic apparatus according to claim 2, wherein, in the first posture, the one edge portion of the first sheet-like member and the another edge portion of the second sheet-like member are each inserted into the groove portion.

5. The electronic apparatus according to claim 4, wherein, in the first posture, the one edge portion of the first sheet-like member and the another edge portion of the second sheet-like member each come into contact with a bottom surface of the groove portion.

6. The electronic apparatus according to claim 1, wherein the first sheet-like member and the second sheet-like member are metal sheets having elasticity.

7. The electronic apparatus according to claim 6, wherein the metal sheets are stainless sheets.

* * * * *